(12) United States Patent
Holman, IV et al.

(10) Patent No.: US 8,326,381 B2
(45) Date of Patent: Dec. 4, 2012

(54) COVER PLATE ASSEMBLY AND METHOD OF OPERATION OF SAME

(75) Inventors: Martin Earl Holman, IV, West Palm Beach, FL (US); Rohit Krishna Koppal, Pompano Beach, FL (US); Felipe Alonso Varela, Sunrise, FL (US); Aaron Robert Allen, Pembroke Pines, FL (US); James C. Infanti, Waterloo (CA); Patrick Yves Mas, Sunrise, FL (US)

(73) Assignee: Research In Motion Limited, Waterloo (CA)

( * ) Notice: Subject to any disclaimer, the term of this patent is extended or adjusted under 35 U.S.C. 154(b) by 428 days.

(21) Appl. No.: 12/637,010

(22) Filed: Dec. 14, 2009

(65) Prior Publication Data
US 2011/0143823 A1    Jun. 16, 2011

(51) Int. Cl.
| H04M 1/00 | (2006.01) |
| H04M 9/00 | (2006.01) |
| H04B 1/00 | (2006.01) |
| G08B 13/14 | (2006.01) |
| G08B 21/00 | (2006.01) |
| H05K 7/00 | (2006.01) |
| H05K 5/00 | (2006.01) |
| G06F 1/16 | (2006.01) |

(52) U.S. Cl. .................. 455/575.4; 455/550.1; 455/566; 455/575.1; 340/572.1; 340/686.1; 361/679.01; 361/679.55; 361/679.56; 379/433.01; 379/433.12

(58) Field of Classification Search ............... 455/575.1, 455/575.2, 575.3, 575.4, 90.3, 425, 426.1, 455/550.1, 566; 340/572.1, 686.1, 686.2, 340/686.3, 686.4, 687, 689; 361/679.01, 361/679.3, 679.26, 679.28, 679.55, 679.56, 361/730, 797, 679.39, 727, 737, 752, 829; 279/426, 433.01, 433.12; 379/426, 433.01, 379/433.12; 312/334.1; 349/60
See application file for complete search history.

(56) References Cited

U.S. PATENT DOCUMENTS 7,665,913 B2 * 2/2010 Kim ............................ 455/575.4
(Continued)

FOREIGN PATENT DOCUMENTS
EP    1075125 A2    2/2001
(Continued)

OTHER PUBLICATIONS

Extended European Search report dated May 7, 2010. In corresponding application No. 09179145.9.

*Primary Examiner* — Matthew Anderson
*Assistant Examiner* — Paul P Tran
(74) *Attorney, Agent, or Firm* — Fitch, Even, Tabin & Flannery, LLP

(57) ABSTRACT

A mobile device is described herein in which the mobile device can have a base portion that can include a guide base and can also have a slider portion that can include a sliding plate. The slider portion can be slidably engaged with the base portion and can move relative to the base portion. The mobile device can also include a cover plate that can be slidably engaged with the guide base of the base portion and the sliding plate of the slider portion. In one arrangement, the cover plate can be configured to selectively cover a slot of the sliding plate. As an example, when the slider portion moves from a closed position to an open position, the cover plate can move in substantially the same direction as the slider portion due to a friction coefficient between the cover plate and the sliding plate being greater than a friction coefficient between the cover plate and the guide base.

13 Claims, 12 Drawing Sheets

U.S. PATENT DOCUMENTS

| | | | |
|---|---|---|---|
| 7,787,919 B2* | 8/2010 | Hsieh et al. | 455/575.4 |
| 8,046,037 B2* | 10/2011 | Jang | 455/575.4 |
| 8,072,741 B2* | 12/2011 | Ma et al. | 361/679.01 |
| 2008/0057998 A1* | 3/2008 | Christensen et al. | 455/550.1 |
| 2009/0116200 A1 | 5/2009 | Yeh | |
| 2009/0147484 A1 | 6/2009 | Chuang | |
| 2010/0022286 A1* | 1/2010 | Wang et al. | 455/575.4 |
| 2010/0099467 A1* | 4/2010 | Lee | 455/575.4 |

FOREIGN PATENT DOCUMENTS

| | | |
|---|---|---|
| EP | 2106100 A2 | 9/2009 |

* cited by examiner

COVER PLATE ASSEMBLY AND METHOD OF OPERATION OF SAME

FIELD OF TECHNOLOGY

The subject matter herein generally relates to cover assemblies and in particular, to cover assemblies in slide-style mobile devices.

BACKGROUND

In recent years, slide-style mobile devices have become popular in the wireless industry. Typically, a slide-style device includes a fixed base portion and a movable slide portion, and when the slide portion is moved, one or more hidden features or components may be accessed. As an example, many slide-style devices include a physical keypad that is hidden underneath the slide portion when the device is in a closed state but that can be used when the slide portion is moved and the device is in an open state. This configuration also allows for a relatively large display to be implemented into the device.

The slide portion generally includes various components, such as a display, a camera or other electronic lines, that need to reach the main printed circuit board (PCB). The main PCB, however, is normally built into the fixed base portion. To accommodate this need, a flexible circuit—a flexible substrate that contains embedded signal traces—is attached to the main PCB and can be fed to the relevant connections in the slide portion.

Referring to FIG. 1, an example of a prior art slide-style mobile device 100 is shown. The device 100 includes a fixed base portion 105 and a movable slide portion 110, which is slidably coupled to the base portion 105. In this view, a back side 115 of the base portion 105 can be seen. A top surface 120 of the base portion 105 is also shown here. In this model, the slide portion 110 includes a slide plate 125, which is generally a piece of sheet metal. The slide plate 125 is used for providing support for the components that are part of the slide portion 110. This particular arrangement in FIG. 1 shows the mobile device 100 in an open position in which components on the lower front surface (not shown) of the base portion 105 can be accessed.

Referring to FIG. 2, a transparent view of the slide plate 125 (shown with a dashed outline) is pictured. The components of FIG. 2 are integrated into the mobile device 100 of FIG. 1. In this view, a front surface 205 of the slide plate 125 faces an operator of the mobile device 100 when, for example, the operator would be looking at a display (not shown) that would be integrated with the slide portion 110. A fixed guide base 210, which is part of the base portion 105 and is slidably coupled to the slide plate 125, is also illustrated. From this vantage point, the slide plate 125 is positioned above the guide base 210. A planar surface 215 that is positioned just above the slide plate 125 and the guide base 210 represents the top surface 120 of the base portion 105 from FIG. 1. A flexible circuit 220, which relays signals between the main PCB (not shown) and components (not shown) in the slide portion 110 is also depicted. The slide plate 125 contains a slot 225 (also has a dashed outline), and the guide base 210 also includes a slot 230, both of which are for accommodating the flexible circuit 220. In this drawing, the slide plate 125 and the guide base 210 are in a closed position, meaning that the base portion 105 and the slide portion 110 are aligned with one another.

Referring to FIG. 3, the slide plate 125 (and hence the slide portion 110 of FIG. 1) has been moved in the vertical direction away from the guide base 210, which indicates an open position. Because it is flexible, the flexible circuit 220 has also moved in this same direction, which allows for the uninterrupted transfer of signals between components of the base portion 105 and the slide portion 110 in this open position. The configuration of the slot 225 of the slide plate 125, however, presents a significant drawback. Notably, the surface of the slide plate 125 that is opposite the front surface 205 can be seen by the operator of the mobile device 100 when the device 100 is in the open position. As such, the operator can see the slot 225 and the flexible circuit 220, which degrades from the overall appearance of the device 100. The portion of the slot 225 that is visible in this state can also be seen in FIG. 1 (see the section with the diagonal hatching). In addition to negatively affecting the visual aspects of the device 100, the slot 225 also presents an open pathway for dirt, water or other contaminants to enter the device 100 when the device 100 is in the open position.

BRIEF DESCRIPTION OF THE DRAWINGS

Embodiments of the present application will now be described, by way of example only, with reference to the attached Figures, wherein.

DETAILED DESCRIPTION

Figure 1:
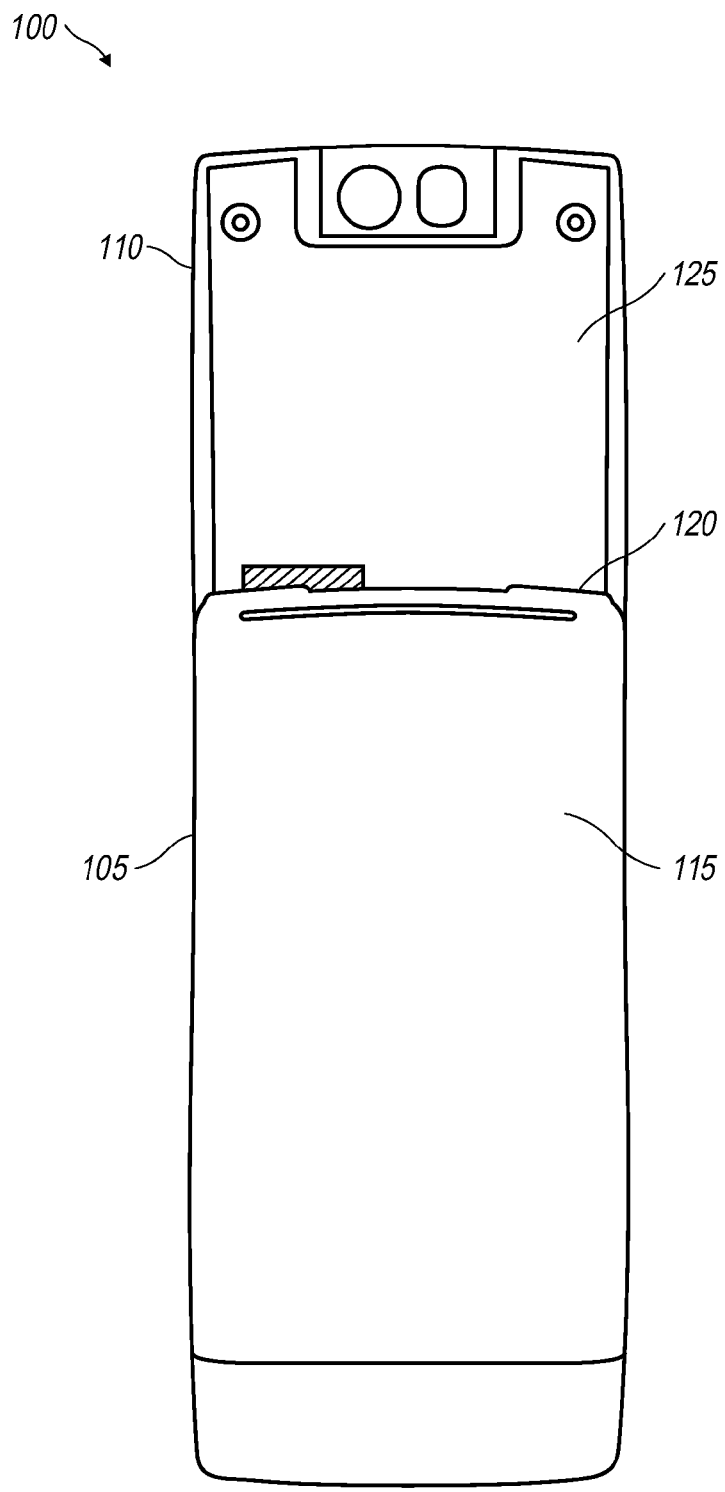
FIG. 1 illustrates a prior art mobile device.
Figure 3:
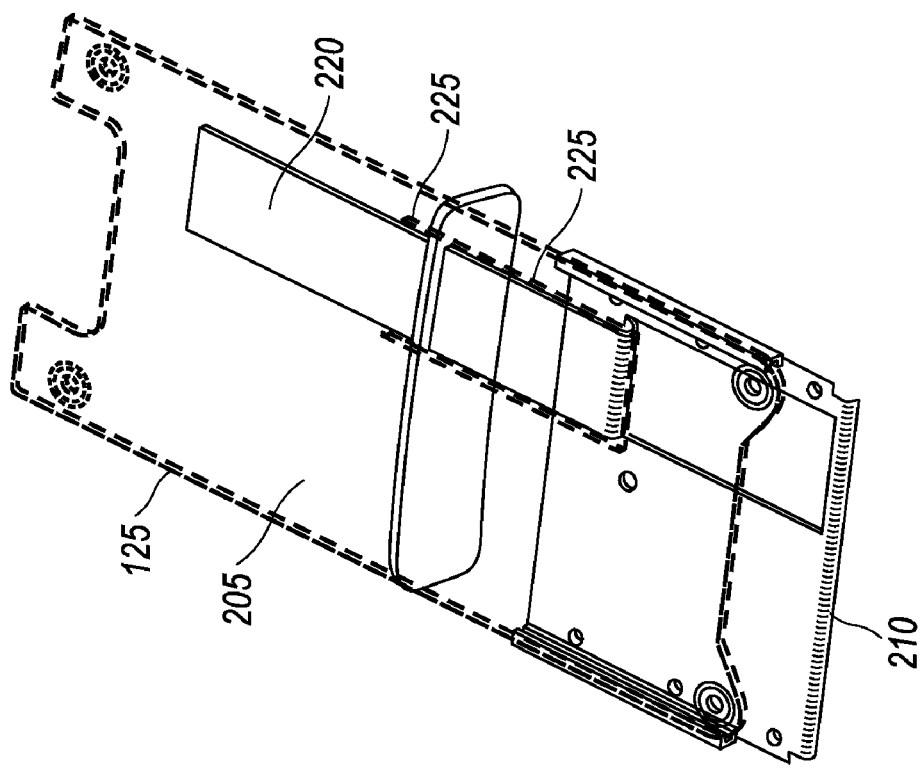
FIG. 3 illustrates the components of the prior art mobile device of FIG. 1 when the prior art mobile device is in an open state.
Figure 2:
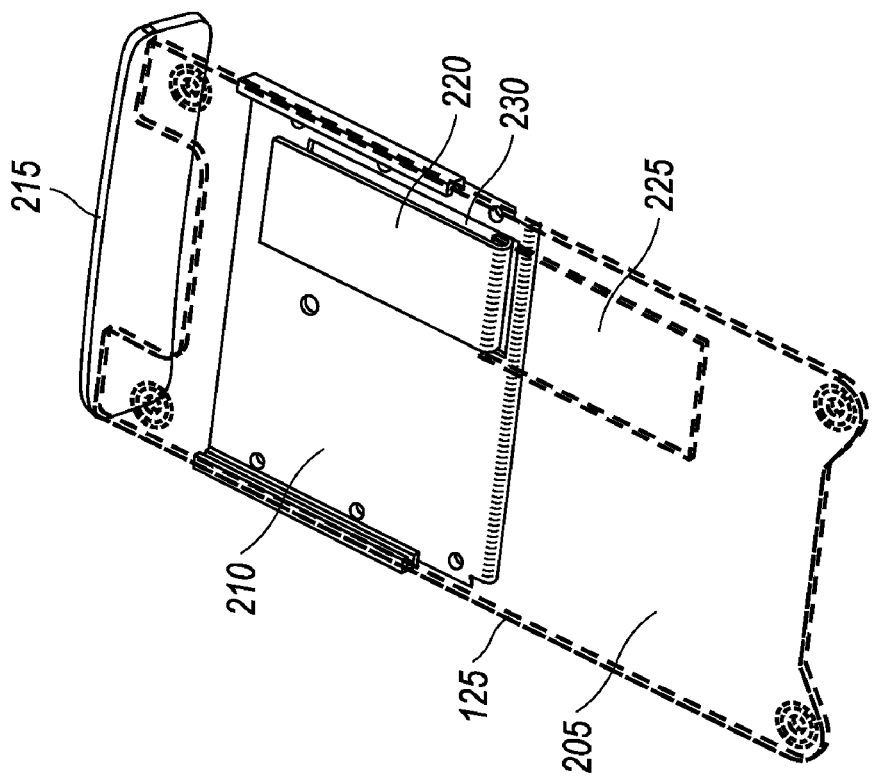
FIG. 2 illustrates some of the components of the prior art mobile device of FIG. 1 when the prior art mobile device is in a closed state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Several definitions that apply throughout this document will now be presented. The word "coupled" is defined as connected, whether directly or indirectly through intervening components and is not necessarily limited to physical connections. The term "mobile device" is defined as any electronic device that is capable of at least accepting information entries or commands from a user and includes its own power source. A "base portion" is defined as a part of a mobile device that remains stationary when other parts of the mobile device are moved. A "slider portion" is defined as a part of a mobile device that moves relative to a base portion of a mobile device. The term "slidably engaged" means a state in which two or more components are coupled to one another in which at least one of the components at least slides with respect to another component. The terms "slide," "slid" or "sliding" are defined as moving, gliding or passing along a surface, although continuous contact is not necessarily required.

A "slot" is defined as an opening or a depression in a surface. The term "friction coefficient" is defined as a ratio of the force of friction between two bodies and the force pressing them together and can refer to static or kinetic friction. The term "substantially flush" is defined as a state in which two or more surfaces are positioned in or nearly in the same plane. A "flexible circuit" is defined as a substrate that includes one or more traces for relaying or transmitting signals and that can be manipulated to twist or bend around other components. The term "display" is defined as an electronic device that generates visual representations of objects or information. The term "keypad" is defined as an interface through which a user may enter commands, including text-based, voice-based or even visual-based commands.

As noted earlier, it is desirable to offer slide-style mobile devices because these devices offer large displays and hidden keypads that can be easily accessed. In view of the relatively long distance that the slider portion of the slide-style mobile device must travel, however, there is a possibility that unsightly openings of the slider portion may become exposed to operators. These openings also present breaches in the housing of a slide-style mobile device through which dirt or other contaminants may enter. A mobile device that overcomes these disadvantages is presented herein.

In one arrangement, the mobile device can have a base portion that can include a guide base and can also have a slider portion that can include a sliding plate. The slider portion can be slidably engaged with the base portion and can move relative to the base portion. The mobile device can also include a cover plate that can be slidably engaged with the guide base of the base portion and the sliding plate of the slider portion. In one arrangement, the cover plate can be configured to selectively cover a slot of the sliding plate. As an example, when the slider portion moves from a closed position to an open position, the cover plate can move in substantially the same direction as the slider portion due to a friction coefficient between the cover plate and the sliding plate being greater than a friction coefficient between the cover plate and the guide base. This configuration can allow for the desired length of travel of the slider portion; while at the same time, it avoids the exposure of internal components of the mobile device.

Figure 4:
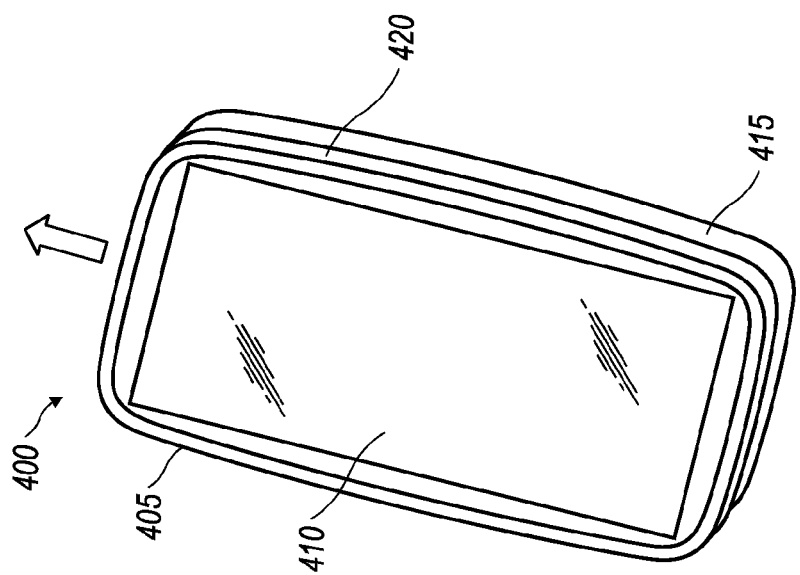
FIG. 4 illustrates an example of a slide-style mobile device in an exemplary closed position.

Referring to FIG. 4, an example of a mobile device 400 is shown. In one arrangement, the mobile device 400 can include a housing 405 and a display 410. As an example, this mobile device 400 can be a slide-style mobile device and can include a base portion 415 and a slider portion 420, which can include the display 410. In this example, the slider portion 420 can be slidably engaged with the base portion 415 and can move relative to the base portion 415, such as in the direction indicated by the arrow. Here, however, the mobile device 400 is shown in a closed position.

Figure 5:
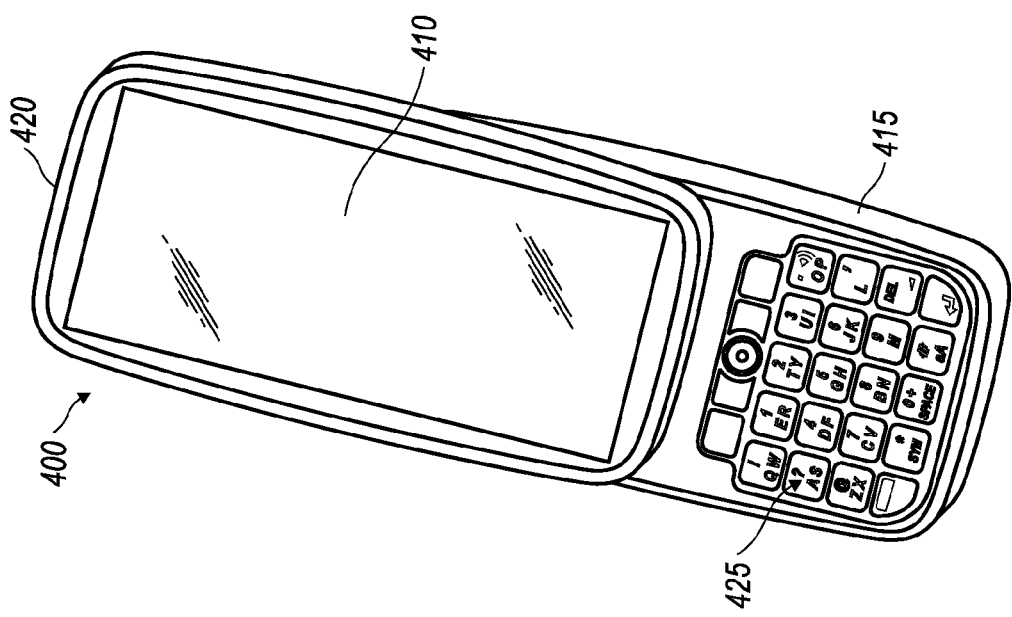
FIG. 5 illustrates an example of the slide-style mobile device of FIG. 4 in an exemplary open position.

The slider portion 420 can be moved to an open position, and referring to FIG. 5, an example of the mobile device 400 in the open position is shown. In this open position, operator access can be provided to a keypad 425 or other user interface that can be part of the base portion 415, although the keypad 425 can be hidden from view by the slider portion 420 in the closed position. The keypad 425 can include a keyfield having alphanumeric keys arranged in a keyboard layout, numeric keys, and other function keys. It is understood, however, that the keypad 425 can alternatively be a touch keypad (not shown) that can be shown on the display 410 or on a secondary display (not shown) on the base portion 415 for touch-screen entry. While in the illustrated embodiment the mobile device 400 is a handheld wireless communication device, the mobile device 400 can be any of the following: a personal digital assistant (PDA), a handheld electronic device, a non-handheld wireless communication device, a pager, a cellular phone, a cellular smart-phone, a wireless organizer, a wirelessly enabled notebook computer and the like.

It is understood that the mobile device 400 is not necessarily limited to the configurations shown in FIGS. 4 and 5. For example, a slider portion can be positioned beneath a base portion such that the base portion can include a display and the slider portion can include a keypad. That is, in the closed position, the slider portion can contain the hidden keypad and could be moved to the open position to permit access to the keypad. Moreover, the sliding direction of the slider portion does not necessarily have to run in the direction shown in FIGS. 4 and 5, as the slider portion can be configured to move in other suitable directions with respect to the base portion.

Figure 6:
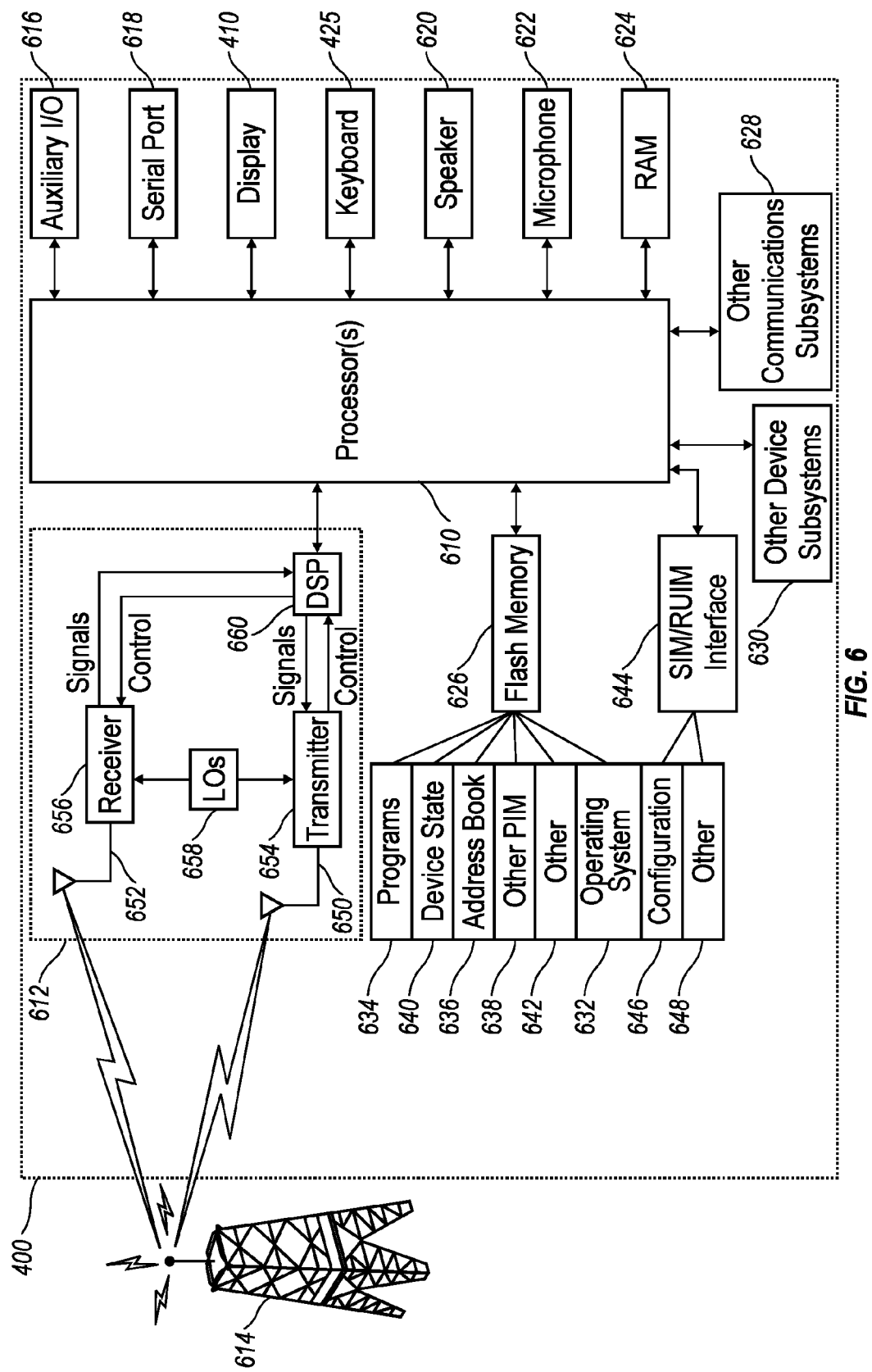
FIG. 6 illustrates an example of a block diagram of several exemplary components that can be part of the mobile device of FIGS. 4 and 5.

Referring to FIG. 6, an example of a block diagram of some of the components that make up the mobile device 400 is shown. The mobile device 400 can include a processor 610 that can control the operation of the mobile device 400. A communication subsystem 612 can perform all communication transmission and reception with a wireless network 614. The processor 610 can further be coupled to an auxiliary input/output (I/O) subsystem 616, which can be coupled to the mobile device 400. In at least one embodiment, the processor 610 can be coupled to a serial port (for example, a Universal Serial Bus port) 618, which can allow for communication with other devices or systems. The display 410 can be coupled to the processor 610 to allow for displaying of information to an operator of the mobile device 400. The keypad 425 (or keyboard) can also be coupled to the processor 610.

The mobile device 400 can include a speaker 620, a microphone 622, random access memory (RAM) 624 and flash memory 626, all of which can be coupled to the processor 610. Other similar components can be provided on the mobile device 400 and optionally coupled to the processor 610. Other communication subsystems 628 and other communication device subsystems 630 are generally indicated as being functionally coupled with the processor 610, as well. An example of a communication subsystem 628 is that of a short range communication system such as BLUETOOTH® communication module or a WI-FI®, communication module (a communication module in compliance with IEEE 802.11 set of protocols) and associated circuits and components.

The processor 610 is able to perform operating system functions and can enable execution of programs on the mobile device 400. In some embodiments, not all of the above components may be included in the mobile device 400. For example, in at least one embodiment, the keypad 425 is not provided as a separate component and is displayed as required on a dynamic touch display. In an embodiment having a dynamic touch display, the keypad 425 can be displayed as a touchscreen keypad. A touchscreen module can be incorporated in such an embodiment such that it is in communication with the processor 610. When inputs are received on the touchscreen keypad, the touchscreen module can send or relay messages corresponding to those inputs to the processor 610.

The auxiliary I/O subsystem 616 can be provided on either the base portion 415 or the slide portion 420 and can take the form of a navigation tool, such as an optical trackpad, a thumbwheel, a mechanical trackball, a joystick, a touch-sensitive interface, or some other I/O interface. Other auxiliary I/O subsystems can include external display devices and externally connected keyboards (not shown). While the above examples have been provided in relation to the auxiliary I/O subsystem 616, other subsystems capable of providing input or receiving output from the mobile device 400 are considered within the scope of this disclosure. Other keys or buttons can be placed along the side of the mobile device 400 to function as escape keys, volume control keys, scrolling keys, power switches, or user programmable keys, and can likewise be programmed accordingly (not shown).

Furthermore, the mobile device 400 can be equipped with components to enable operation of various programs, as shown in FIG. 6. In an exemplary embodiment, the flash memory 626 can be enabled to provide a storage location for an operating system 632, device programs 634 and data. The operating system 632 can generally be configured to manage other programs 634 that are also stored in flash memory 626 and executable on the processor 610. The operating system 632 can honor requests for services made by programs 634 through predefined program 634 interfaces. More specifically, the operating system 632 can typically determine the order in which multiple programs 634 are executed on the processor 610 and the execution time allotted for each program 634, manage the sharing of flash memory 626 among multiple programs 634, handle input and output to and from other device subsystems 630, and so on. In addition, operators can typically interact directly with the operating system 632 through a user interface, which can include the display 410 and the keypad 425. While in an exemplary embodiment, the operating system 632 is stored in flash memory 626, the operating system 632 in other embodiments is stored in read-only memory (ROM) or a similar storage element (not shown). As those skilled in the art will appreciate, the operating system 632, the device program 634 or parts thereof can be loaded in RAM 624 or some other volatile memory.

In one exemplary embodiment, the flash memory 626 can contain programs 634 for execution on the mobile device 400 including an address book 636, a personal information manager (PIM) 638 and the device state 640. Furthermore, programs 634 and other information 642 including data can be segregated upon storage in the flash memory 626 of the mobile device 400.

When the mobile device 400 is enabled for two-way communication within the wireless communication network 614, it can send and receive messages from a mobile communication service. Examples of communication systems enabled for two-way communication can include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX) networks, Long Term Evolution (LTE) networks and other networks that can be used for data and voice, or just data or voice.

For the systems listed above, the mobile device 400 can require a unique identifier to enable the mobile device 400 to transmit and receive messages from the communication network 614. Other systems may not require such identifying information. As an example, GPRS, UMTS, and EDGE use a Subscriber Identity Module (SIM) in order to allow communication with the communication network 614. Likewise, most CDMA systems use a Removable User Identity Module (RUIM) to communicate with the CDMA network. The RUIM and SIM card can be used in multiple different mobile devices 400. The mobile device 400 can be able to operate some features without a SIM/RUIM card. A SIM/RUIM interface 644 located within the mobile device 400 can allow for removal or insertion of a SIM/RUIM card (not shown). The SIM/RUIM card can feature memory and can hold key configurations 646, and other information 648, such as identification and subscriber related information. With a properly enabled mobile device 400, two-way communication between the mobile device 400 and communication network 614 is possible.

The two-way communication enabled mobile device 400 can both transmit and receive information from the communication network 614. The transfer of communication can be from the mobile device 400 or to the mobile device 400. To communicate with the communication network 614, the mobile device 400 in the presently described exemplary embodiment is equipped with an integral or internal antenna 650 for transmitting messages to the communication network 614. Likewise, the mobile device 400 in the presently described exemplary embodiment can be equipped with another antenna 652 for receiving communication from the communication network 614. These antennae (650, 652), in another exemplary embodiment, can be combined into a single antenna (not shown). As one skilled in the art would appreciate, the antenna or antennae (650, 652) in another embodiment can be externally mounted on the mobile device 400. The mobile device 400 can also have a transmitter 654 and a receiver 656, which can be respectively coupled to antennae (650, 652), and can also include one or more local oscillators 658 for processing the incoming or outgoing RF signals. The mobile device 400 can also have a digital signal processor (DSP) 660 to assist in the processing of the incoming and outgoing signals.

Figure 7:
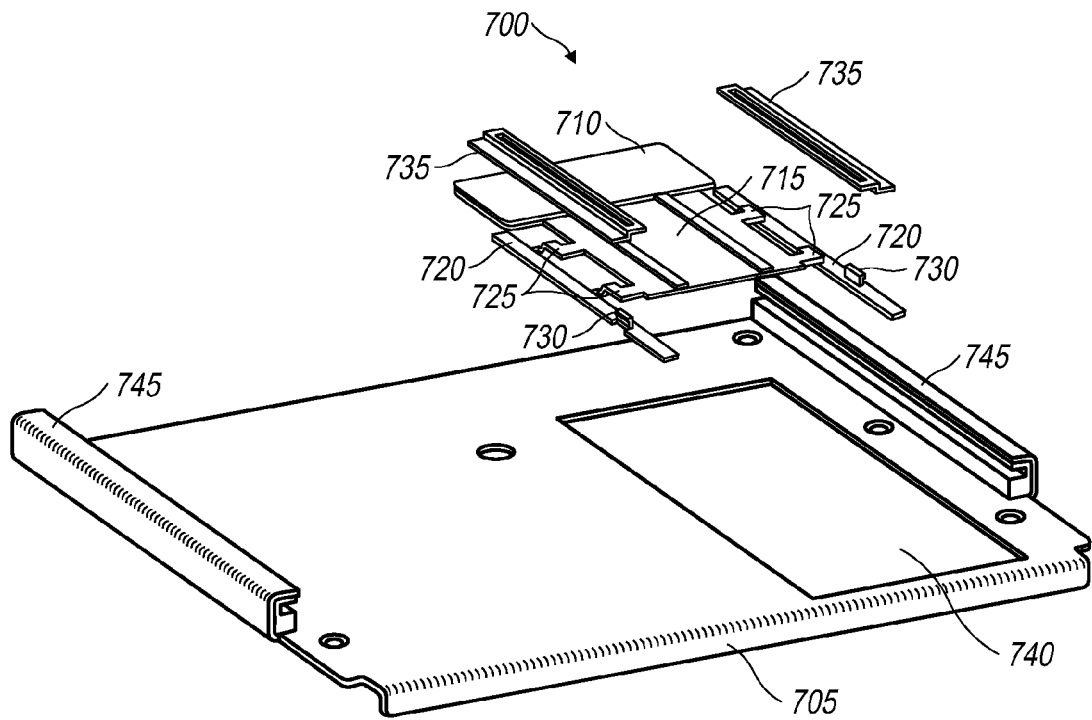
FIG. 7 illustrates an exploded view of an exemplary cover plate and guide base.

As noted earlier, the mobile device 400 can be a slide-style mobile device that can alleviate the problem of exposing internal components when the mobile device 400 is in an open position, for example. Referring to FIG. 7, an exploded view of a cover plate assembly 700 that can be implemented in the mobile device 400 is shown. The cover plate assembly 700 can include a guide base 705 and a cover plate 710. In one arrangement, the guide base 705 can be part of the base portion 415 (see FIGS. 4 and 5), and the cover plate 710 can be slidably engaged with the guide base 705. In another arrangement, the cover plate 710 can include a body 715, one or more legs 720 and one or more flexible connectors 725 that can connect the legs 720 with the body 715. The flexible connectors 725 can be made of a flexible material that can permit the cover plate 710 to move or transition between a compressed state and a release state, details of which will be presented below. The legs 720 can also include one or more fins 730, which can engage and slide along one or more rails 735. As an example, the rails 735 can be separate items and can be secured to the guide base 705 through any suitable technique; however, the rails 735 may be an integrated part of the guide base 705 in an alternative embodiment.

To permit passage of a flexible circuit (not shown here) between the base portion 415 and the slider portion 420, the guide base 705 can define a slot 740 that can receive the flexible circuit. The guide base 705 can also have a second set of rails 745, which can receive a sliding plate (not shown here) that can be positioned over the guide base 705.

Figure 8:
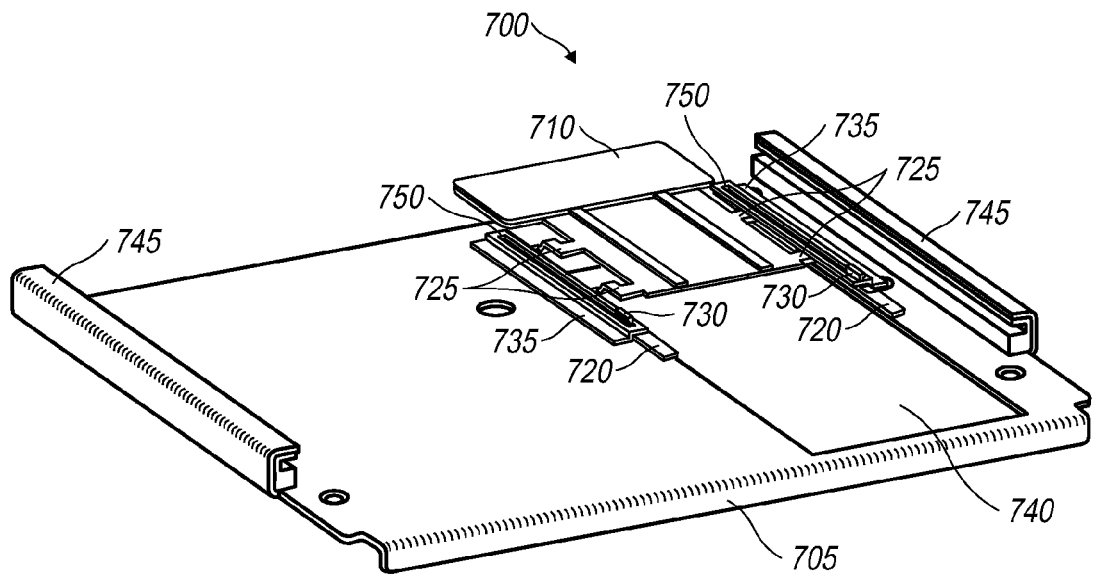
FIG. 8 illustrates the exemplary cover plate and guide base of FIG. 7 assembled together.

Referring to FIG. 8, the components of the cover plate assembly 700 are shown in an exemplary arrangement in which the components are assembled together. As can be seen, the rails 735 can be positioned on the guide base 705, such as on either side of the slot 740 closer to a top portion of the guide base 705. Further, the fins 730 of the cover plate 710 can fit inside and slide along a channel 750 of each rail 735. The fins 730 can also limit the distance that the cover plate 710 can slide, as the fins 730 can eventually contact upper or lower ends of the channels 750, such as what is pictured in FIG. 8. In one arrangement, the legs 720 of the cover plate 710 can be positioned underneath the channels 750 of the rails 735 and can also slide along surfaces of the guide base 705 that are adjacent to the slot 740. Additionally, the flexible connectors 725 of the cover plate 710 can be positioned inside the rails 735. As mentioned above, the flexible connectors 725 can assist in the cover plate 710 moving or transitioning between a compressed state and a release state. In FIG. 8, the cover plate 710 is shown in a release state.

Figure 9:
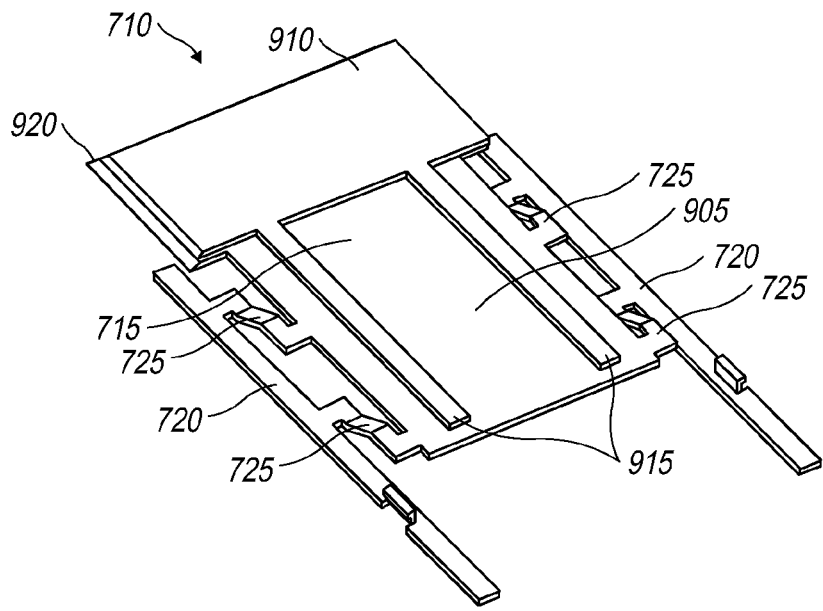
FIG. 9 illustrates a close-up view of the cover plate shown in FIG. 7.

Turning to FIG. 9, a closer view of the cover plate 710 is presented. In one arrangement, the body 715 and the legs 720 can be made of metal, and at least part of the metal of the body 715 can be covered with plastic. That is, the body 715 of the cover plate 710 can include a metal section 905 and a plastic section 910. As an example, the plastic section 910 can be formed by insert molding a plastic material over part of the body 715. In one arrangement, the plastic section 910 can include one or more extensions 915, which can extend along the metal section 905. As will be shown later, the extensions 915 can provide support and protection for the body 715 and can also serve as a guide for a flexible circuit (not shown here) positioned between the extensions 915. In another arrangement, the plastic section 910 can include a beveled edge 920. This beveled edge 920, as will be explained later, can engage other similar surfaces to assist in moving the cover plate 710.

As an example, the flexible connectors 725 of the cover plate 710 can be made of metal. This metal can have a thickness that supports the flexibility of the flexible connectors 725 and that also enables the flexible connectors 725 to move the cover plate 710 between the compressed and release states.

Figure 10:
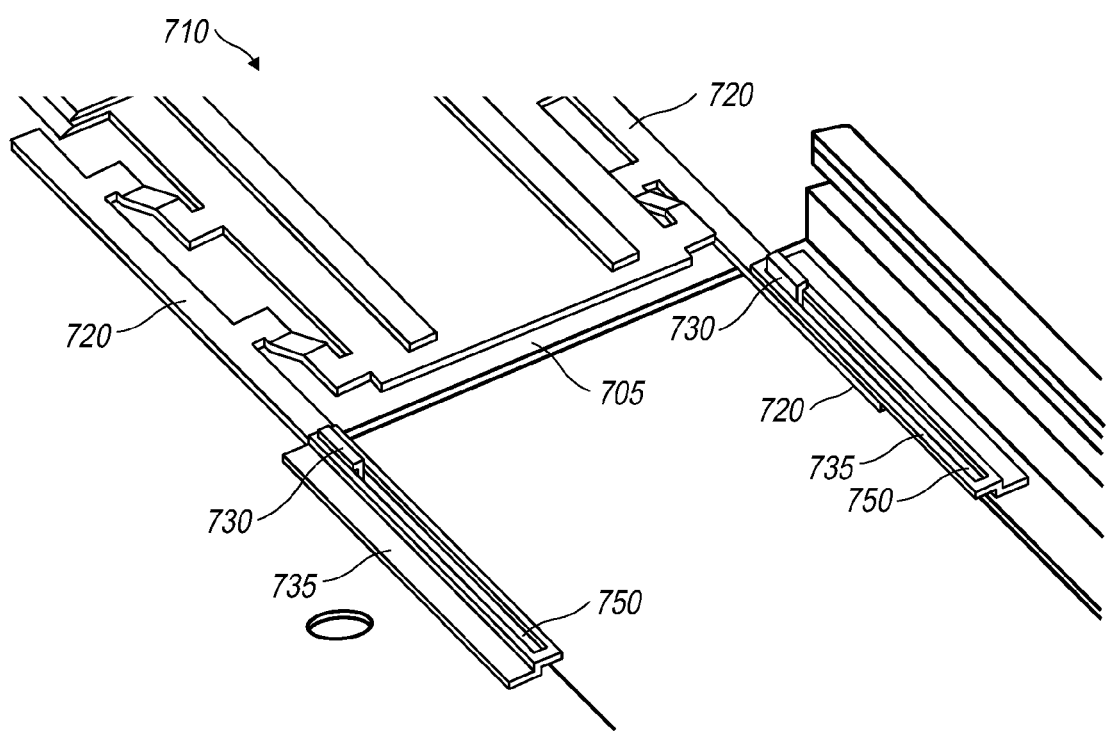
FIG. 10 illustrates the exemplary cover plate of FIG. 9 assembled to the exemplary guide base of FIG. 8.

Referring to FIG. 10, a closer view of the legs 720 of the cover plate 710 and the rails 735 of the guide base 705 is shown. As can be seen, the fins 730 of the legs 720 can engage the channels 750 of the rails 735, and the legs 720 can be positioned underneath the channels 750. As an example, the legs 720 can slide along the guide base 705, and this can cause the fins 730 to ride along the channels 750. In addition to the legs 720, the guide base 705 can be made of metal, which can result in a metal-to-metal contact between the legs 720 and the guide base 705. The fins 730 can also serve as a stop by contacting the ends of the channels 750, which can limit the distance that the cover plate 710 can travel.

Figure 11:
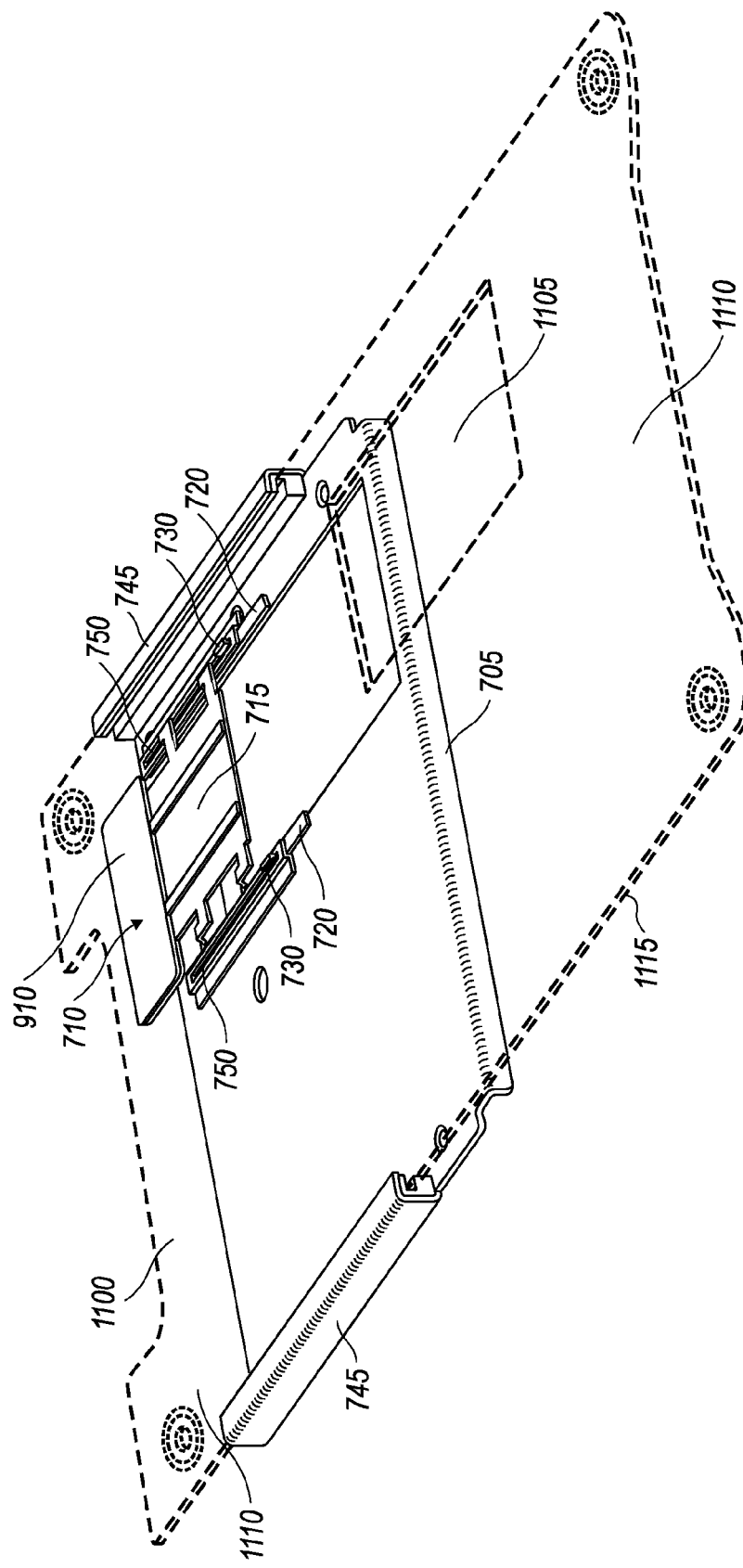
FIG. 11 illustrates an example of the sliding plate, the cover plate and the guide base in an exemplary closed position.

Referring to FIG. 11, an example of a sliding plate 1100, which can be part of the slider portion 420, is pictured. As an example, the sliding plate 1100 can be made of metal. As another example, the sliding plate 1100 can be slidably engaged with the second set of rails 745 of the guide base 705. As another example, the sliding plate 1100 can be positioned over the guide base 705 and the cover plate 710. To show the interaction between these components, the sliding plate 1100 is shown in a transparent state with a dashed outline, although it is understood that the sliding plate 1100 is not necessarily limited to this particular configuration.

Similar to the guide base 705, the sliding plate 1100 can define a slot 1105 (also with a dashed outline) that can be configured to receive a flexible circuit (not shown here). The sliding plate 1100 can also have an exposable or top surface 1110, part of which, when the mobile device 400 is in the open position, can be seen by the user. The slot 1105 can be part of the exposable surface 1110. The sliding plate 1100 can also include a bottom surface 1115, and the cover plate 710 can be sandwiched between the bottom surface 1115 of the sliding plate 1100 and the guide base 705. In one particular arrangement, the plastic section 910 of the body 715 of the cover plate 710 can be in contact with the bottom surface 1115, and, as mentioned earlier, the legs 720 of the cover plate 710 can be in contact with the guide base 705. Instead of the metal-to-metal contact that forms the engagement between the legs 720 of the cover plate 710 and the guide base 705, the metal sliding plate 1100 and the plastic section 910 of the cover plate 710 can form a plastic-to-metal relationship. The plastic-to-metal contact between the plastic section 910 of the cover plate 710 and the bottom surface 1115 of the sliding plate 1100 can have a greater friction coefficient than that of the metal-to-metal contact between the legs 720 of the cover plate 710 and the guide base 705.

In the state pictured in FIG. 11, the sliding plate 1100 is shown in the closed position (the slider portion 420 can also be in the closed position). In this scenario, the fins 730 can be positioned at a lower end of the channels 750. Also, the cover plate 710 can be in a compressed state, primarily because the flexible connectors 725 can be compressed due to the tight clearance between the bottom surface 1115 of the sliding plate 1100 and the guide base 705.

Figure 12:
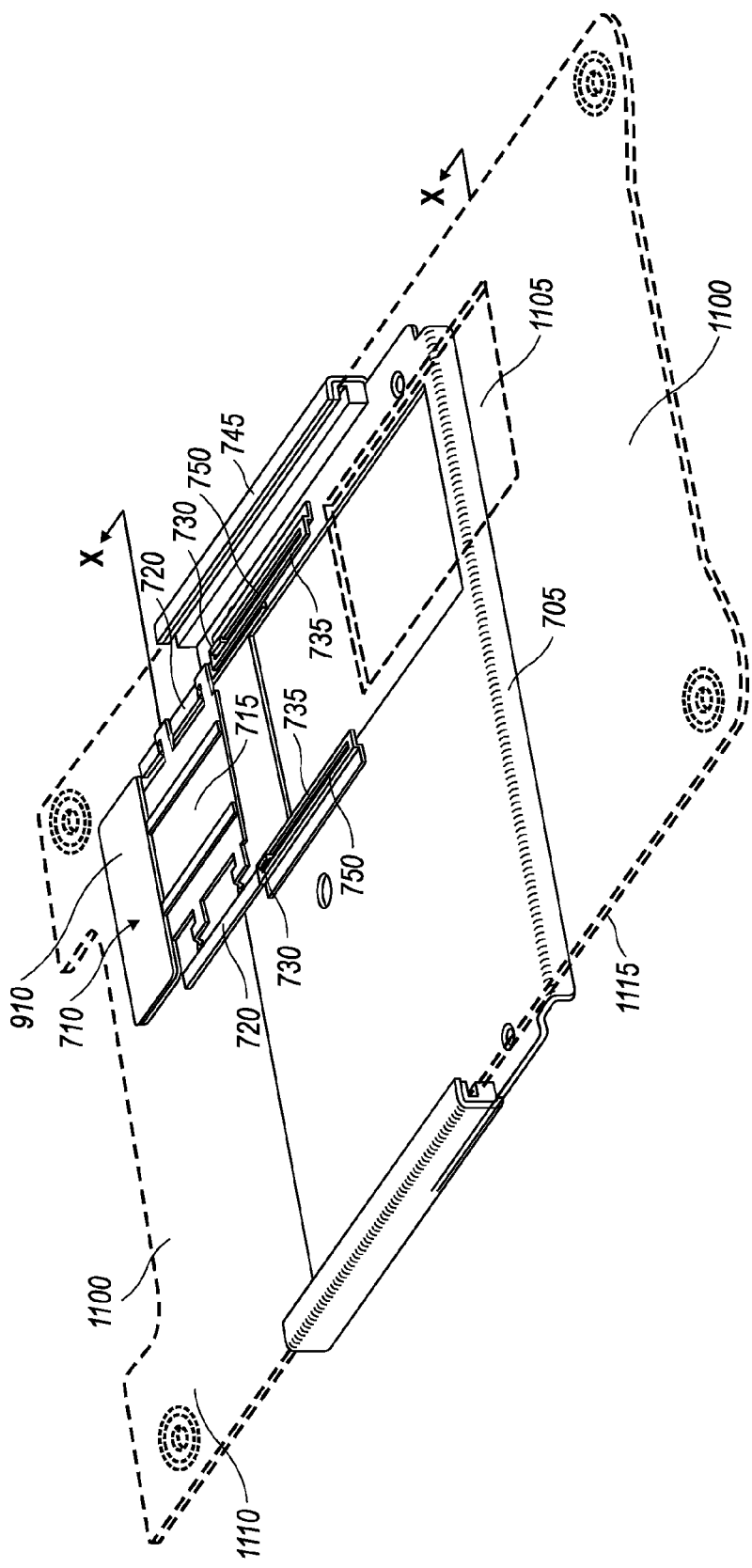
FIG. 12 illustrates the sliding plate, the cover plate and the guide base of FIG. 11 as these components move away from the exemplary closed position of FIG. 11.

Referring to FIGS. 4 and 12, an example of the sliding plate 1100 of the slider portion 420 moving from a closed position towards an open position will be described. In comparison to FIG. 11, it can be seen that the cover plate 710 can move along with the sliding plate 1100 of the slider portion 420 in substantially the same direction, which in this case can be referred to as an X-direction. In this movement, the fins 730 that are engaged with the channels 750 of the rails 735 can slide along the rails 735 as the cover plate 710 and the sliding plate 1100 of the slider portion 420 move in the X-direction. In one arrangement, the cover plate 710 can move along with the sliding plate 1100 at least until the fins 730 contact the upper end of the channels 750. In one particular example—although certainly without limitation—the distance that the cover plate 710 can move when the slider portion 420 is moved from the closed position can be about fourteen millimeters (mm). One can also see how the slot 1105 of the sliding plate 1100 has moved along the X-direction towards the top of the guide base 705.

The cover plate 710 can move along with the sliding plate 1100 of the slider portion 420 because the friction coefficient between these two components can be greater than that between the legs 720 of the cover plate 710 and the guide base 705. This principle is due to the plastic-metal contact between the plastic section 910 and the sliding plate 1100 being better suited for maintaining a grip between the two surfaces as compared to the metal-metal contact between the legs 720 and the guide base 705. To ensure that this configuration operates efficiently, a lubricant can be applied between the legs 720 and the guide base 705.

Although plastic-metal and metal-metal contacts are described here, it must be stressed that other materials can be implemented. For example, a metal-metal contact can exist between the cover plate 710 and the sliding plate 1100 and a plastic-metal contact can exist between the cover plate 710 and the guide base 705, so long as the frictional coefficient between the cover plate 710-sliding plate 1100 contact is greater than the frictional coefficient of the cover plate 710-guide base 705 contact. The type of materials selected for these components can be wide-ranging. In addition, certain physical structures can be added to the components to assist in the operation. For example, grooves (not shown) or small protrusions (not shown) may be added to one or both of the cover plate 710 and the sliding plate 1100 to help these components maintain better contact with one another.

Figure 13:
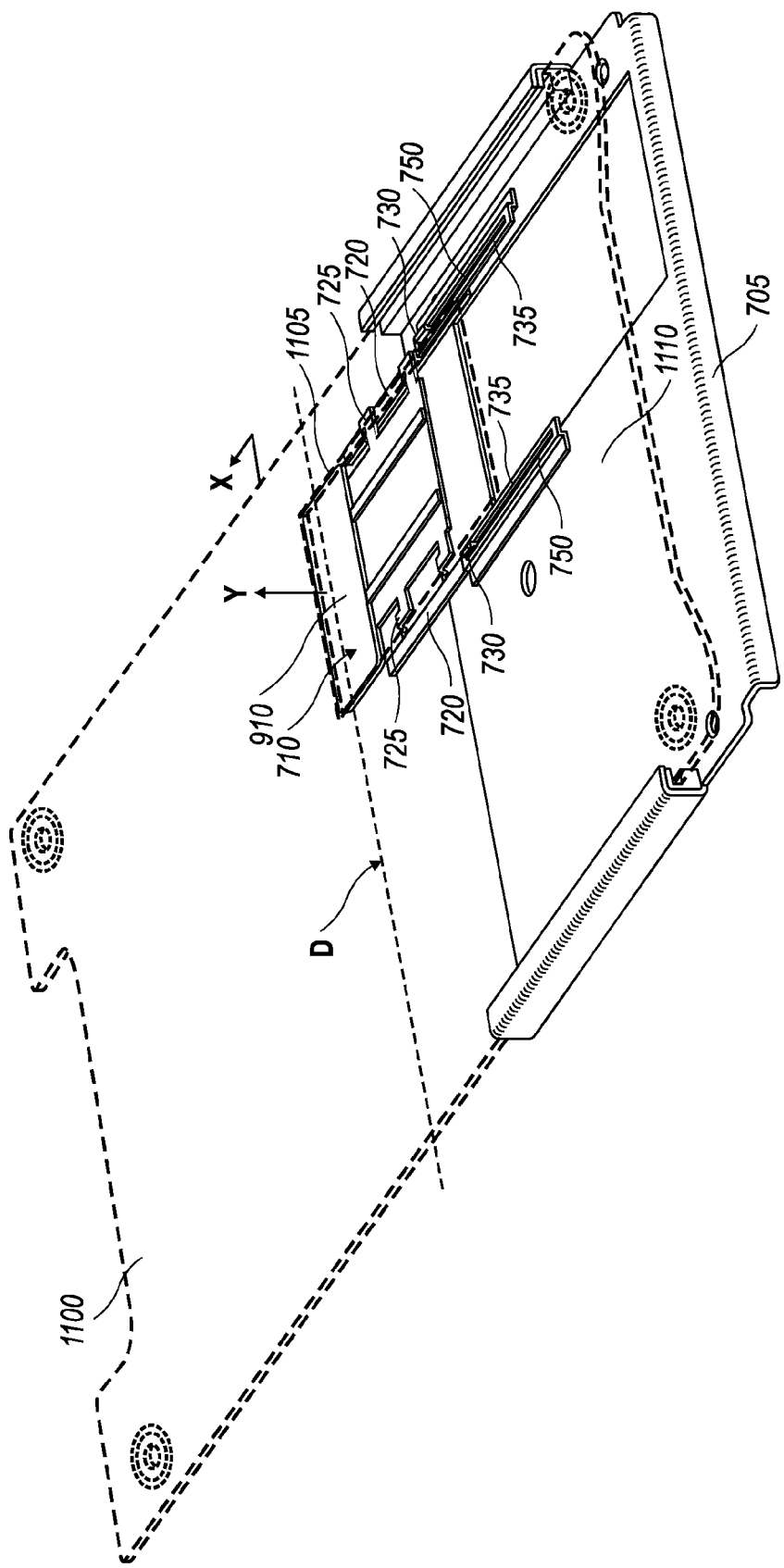
FIG. 13 illustrates the sliding plate, the cover plate and the guide base of FIG. 11 in an exemplary open position.

Referring to FIG. 13, an example of the sliding plate 1100 of the slider portion 420 (see FIG. 4) moved to the open position is shown. Once the fins 730 reach the upper ends of the channels 750, as illustrated here and in FIG. 12, the sliding plate 1100 can continue to move in the X-direction. As such, the slot 1105 of the sliding plate 1100 can eventually move over the cover plate 710. In view of the opening provided by the slot 1105, the cover plate 710 can transition to a release state, as the flexible connectors 725 can force the cover plate 710 to move in a second direction. This direction can be substantially perpendicular to the X-direction and can be referred to as a Y-direction. Movement of the cover plate 710 in the X-direction and the Y-direction can occur simultaneously or at different times.

When the cover plate 710 moves in the Y-direction to the release state and the sliding plate 1100 of the slider portion 420 is in the open position, the cover plate 710 can selectively cover the slot 1105 of the sliding plate 1100. The dashed line D that is shown in FIG. 13 can represent the top of the base portion 415 (see FIG. 4) when the slider portion 420 is in the open position. Thus, in this configuration, the cover plate 710 can cover any internal components that would normally be visible when the mobile device 400 is in the open position and can prevent contaminants from entering the mobile device 400.

Figure 14:
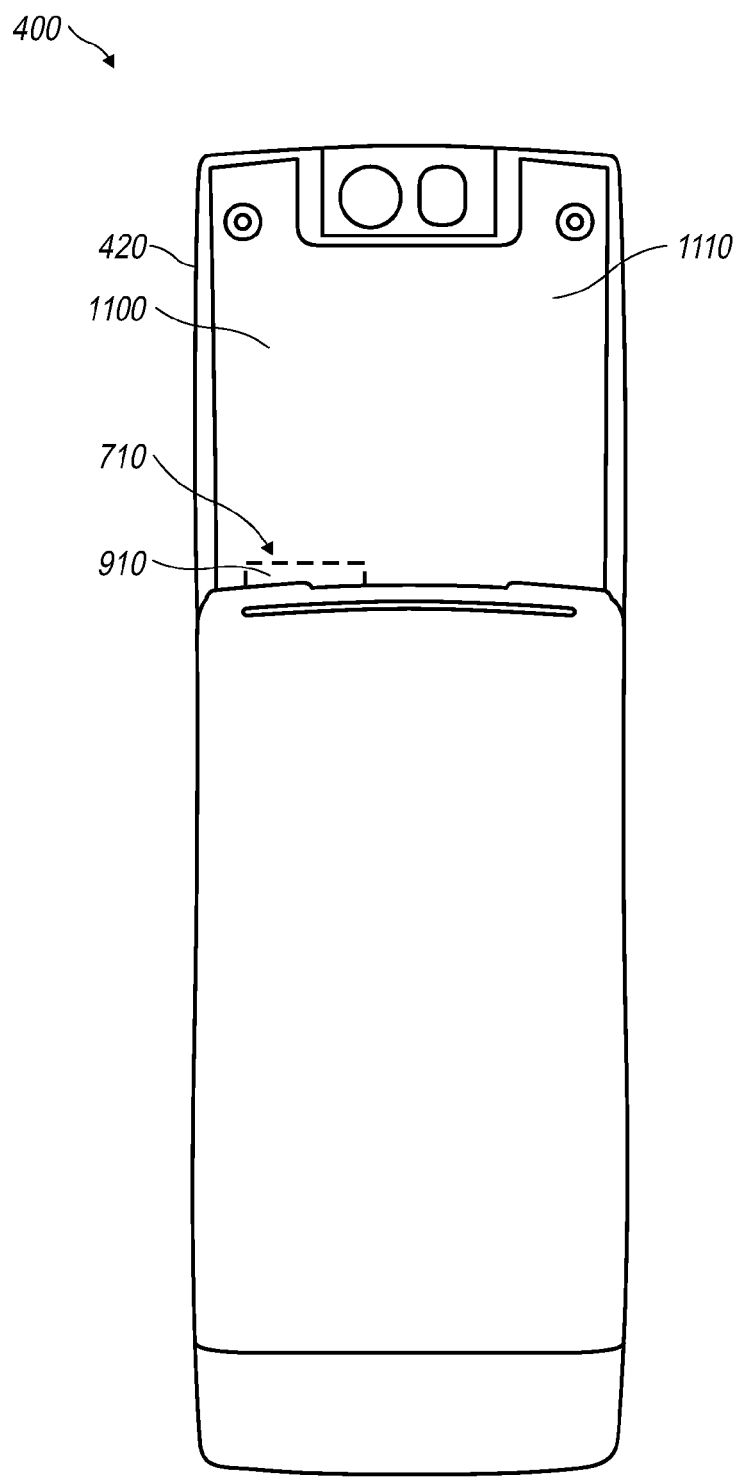
FIG. 14 illustrates an example of a back view of the slide-style mobile device of FIG. 4 in an open position.

Referring to FIG. 14, an example of the mobile device 400 with the slider portion 420 in the open position is shown. Here, the exposable surface 1110 of the sliding plate 1100 can be seen by the operator. The cover plate 710, however, can prevent the operator from seeing the slot 1105 (see FIG. 13) of the sliding plate 1100 and certain components in the slider portion 420. In this illustration, the perimeter of the cover plate 710 is shown with a dashed outline. A designer may wish to match the appearance of the plastic section 910 of the cover plate 710 with that of the exposable surface 1110 of the sliding plate 1100. In another arrangement, when in this release state, the plastic section 910 of the cover plate 710 can be substantially flush with the exposable surface 1110 that surrounds the slot 1105 of the sliding plate 1100.

Figure 15:
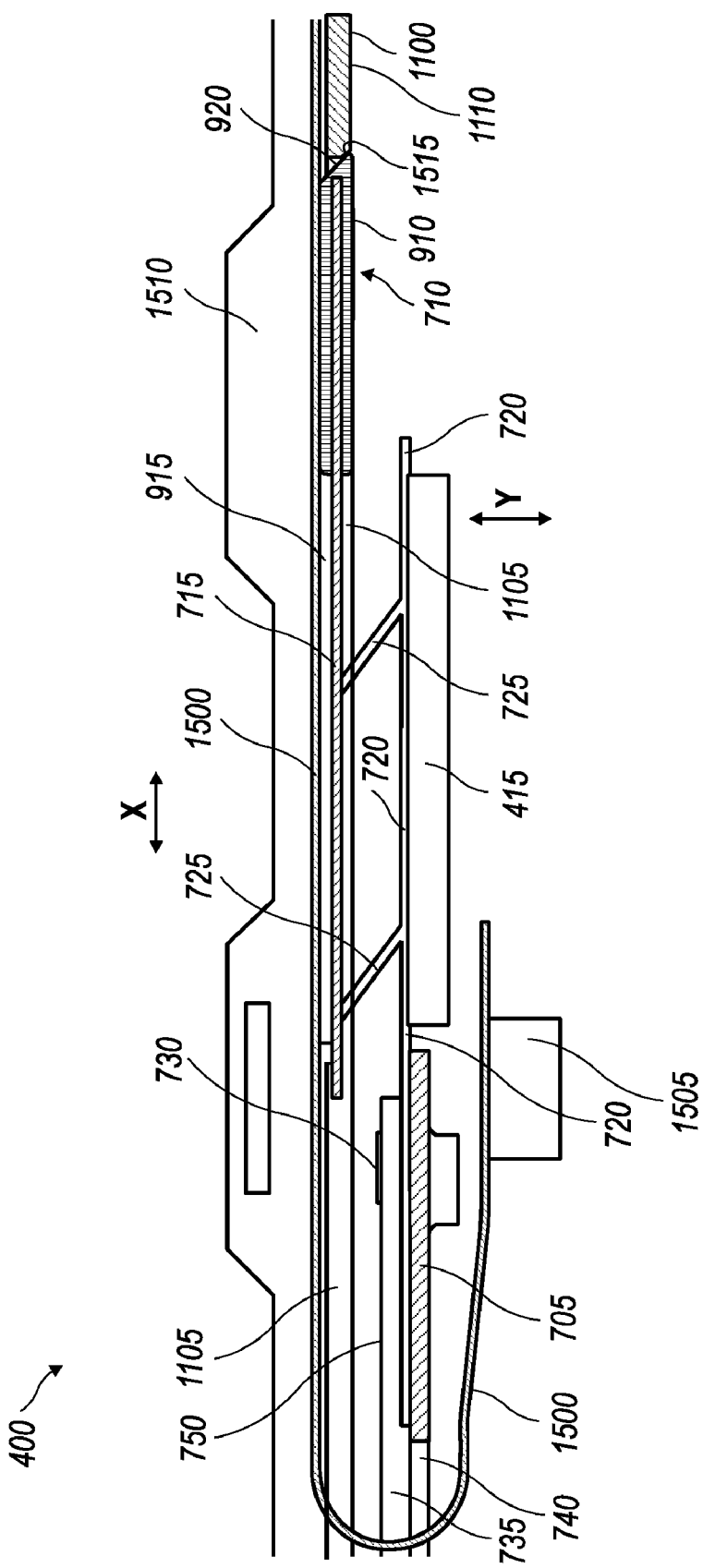
FIG. 15 illustrates an example of a cross-section of the exemplary slide-style mobile device of FIG. 14.

Referring to FIG. 15, a cross-sectional view of a portion of the mobile device 400 of FIG. 14, which can include many of the components illustrated in FIGS. 7-13, is shown. In this example, the mobile device 400 (and the slider portion 420) is in the open position, and the cover plate 710 can be substantially flush with the sliding plate 1100. As can be seen, the plastic section 910 of the cover plate 710 can be substantially flush with the exposable surface 1110 of the sliding plate 1100. In addition, the fin 730 of one of the legs 720 of the cover plate 710 can be positioned at the upper end of one of the channels 750 of the rails 735. This leg 720 is shown as being in contact with the guide base 705 and part of the base portion 415.

Here, the cover plate 710 is also shown in the release state. Because the cover plate 710 has moved within the slot 1105 of the sliding plate 1100, the flexible connectors 725 can force the cover plate 710 in the Y-direction, towards the top of the page. In one arrangement, the flexible connectors 725 can be positioned at a non-orthogonal angle with respect to the body 715 of the cover plate 710 and the legs 720 of the cover plate 710. This configuration can help the flexible connectors 725 easily transition the cover plate 710 between the compressed and release states. The design of the flexible connectors 725, because no springs are employed, can also help reduce the effects of vibrations from vibrating components, such as those from an offset-weight motor for generating vibrational alerts.

A flexible circuit 1500 is also shown in this illustration. As an example, the flexible circuit 1500 can be attached to a substrate 1505 (such as a printed circuit board) of the base portion 415 and can be fed through the slot 740 of the guide base 705 and the slot 1105 of the sliding plate 1100. The flexible circuit 1500 can continue along this path to be connected to components in the slider portion 420 (see FIG. 14). In one arrangement, the flexible circuit 1500 can be adjacent to a display wall 1510, and the extensions 915 of the cover plate 710 can assist in the proper positioning of the flexible circuit 1500. One can see how the flexible circuit 1500 is positioned behind the plastic section 910 of the cover plate 710, which can hide the flexible circuit 1500 from view when the mobile device 400 is in the open position. This arrangement can also prevent contaminants from reaching the flexible circuit 1500 or other components in the slider portion 420 (see FIG. 14). To provide additional cover, the legs 720 can be designed to reach beyond the top of the base portion 415 when the mobile device 400 is in the open position. Because of its ability to mask the slot 1105, the cover plate 710 can permit the slider portion 420 to move farther along the X-direction (to the right of the page) to the open position than what would normally be available to avoid exposing the slot 1105 to an external environment.

Referring to FIGS. 12, 14 and 15, to move the slider portion 420 of the mobile device 400 back to the closed position, an operator may simply force the slider portion 420 back down the X-direction. As noted earlier, in the closed position, the cover plate 710 can be positioned between the sliding plate 1100 and the guide base 705. To assist in this move, the sliding plate 1100 can have a beveled edge 1515 (best shown in FIG. 15), which can cooperate with the beveled edge 920 of the cover plate 710 to force the cover plate 710 below the sliding plate 1100 when the sliding plate 1100 is moved back towards the closed position. Eventually, a sufficient amount of contact between the cover plate 710 and the sliding plate 1100 can occur. Because of the higher friction coefficient between these two components (as compared to that between the legs 720 of the cover plate 710 and the guide base 705), this contact can cause the cover plate 710 to also move along the X-direction back towards the closed position. The cooperation between the beveled edges 920, 1515 can also force the cover plate 710 back into a compressed state. Each of these components can then return to the closed position, an example of which is shown in FIGS. 4 and 11.

Figure 16:
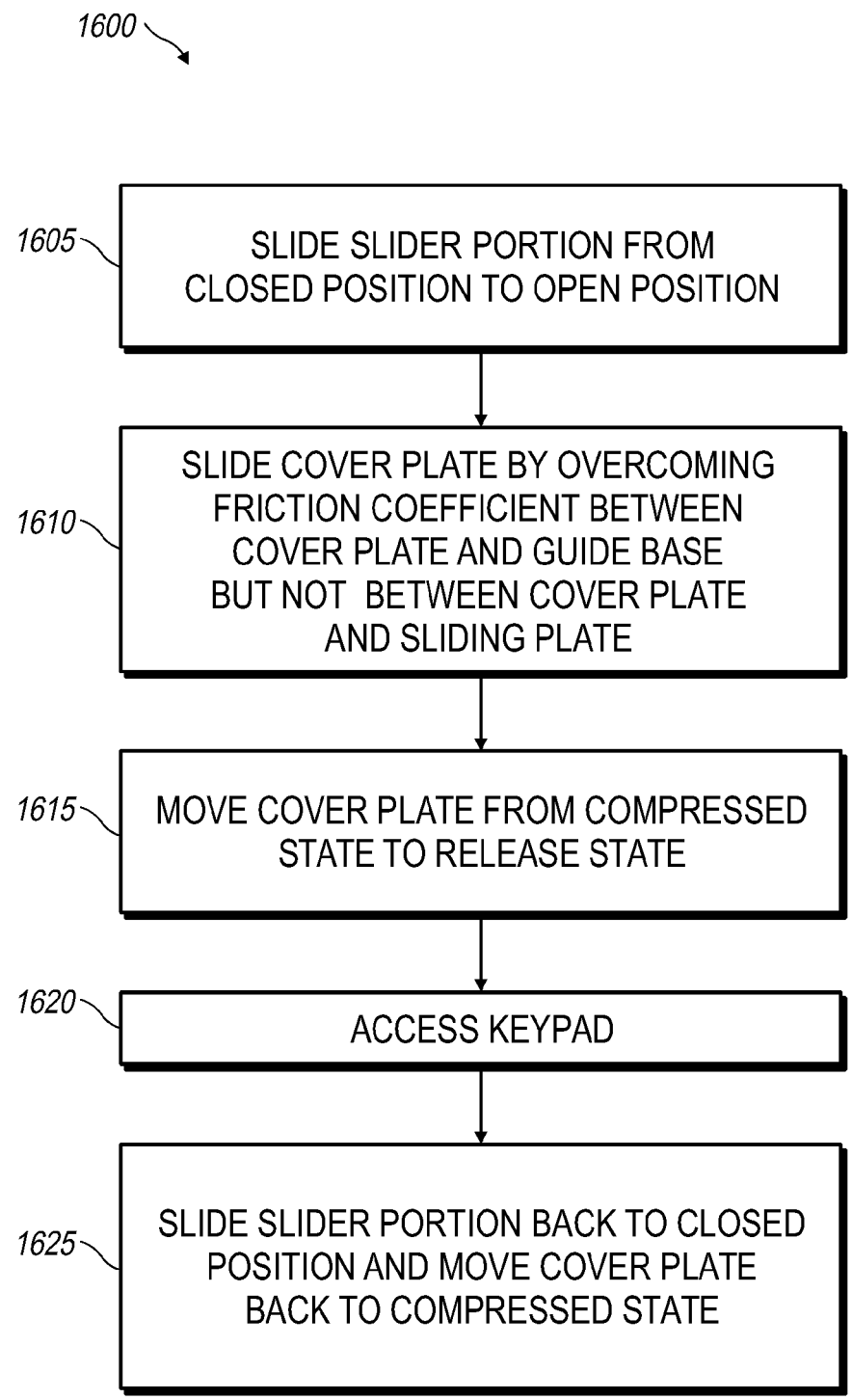
FIG. 16 illustrates an example of a method of operating the mobile device.

Referring to FIG. 16, a method 1600 of operating a mobile device having a base portion and a slider portion that is slidably engaged with the base portion is shown. At step 1605, the slider portion of the mobile device can be slid relative to the base portion from a closed position to an open position. At step 1610, a cover plate can also be slid along with the slider portion by overcoming a friction coefficient between the cover plate and a guide base of the base portion but not overcoming a friction coefficient between the cover plate and a sliding plate of the slider portion. At step 1615, the cover plate can also be moved from a compressed state to a release state as the slider portion moves to the open position such that the cover plate is substantially flush with surfaces of the sliding plate. A keypad that is part of the base portion can also be accessed, as shown at step 1620, such as when the slider portion is in the open position. Finally, at step 1625, the slider portion can be slid back to the closed position and the cover plate can also be moved back to a compressed state. It is understood that this method may be applicable to the structures described herein; however, the method is not limited to being practiced with any such embodiment.

Portions of the mobile device 400 and supporting components can take the form of hardware elements, software elements or elements containing both hardware and software. In one embodiment, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the system can be centralized or distributed (or a combination thereof) as known to those skilled in the art.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be coupled to the system either directly or through intervening I/O controllers.

Examples have been described above regarding a cover plate assembly and method of operating same. Various modifications to and departures from the disclosed embodiments will occur to those having skill in the art. The subject matter that is intended to be within the spirit of this disclosure is set forth in the following claims.

What is claimed is:

1. A mobile device, comprising:
a base portion that includes a guide base;
a slider portion that includes a sliding plate, wherein the slider portion is slidably engaged with the base portion and moves relative to the base portion; and
a cover plate that is slidably engaged with the guide base of the base portion and the sliding plate of the slider portion, wherein the cover plate is configured to selectively cover a slot defined in the sliding plate;
wherein when the slider portion moves from a closed position to an open position, the cover plate moves in substantially the same direction as the slider portion due to a friction coefficient between the cover plate and the sliding plate being greater than a friction coefficient between the cover plate and the guide base;
wherein the cover plate is further configured to transition from a compressed state to a release state as the slider portion moves from the closed position to the open position and wherein the cover plate further comprises one or more flexible connectors that cause the cover plate to move from the compressed state to the release state, and when the cover plate is in the release state, the cover plate is substantially flush with surfaces of the sliding plate that surround the slot of the sliding plate.

2. The mobile device according to claim 1, wherein the cover plate includes a body and one or more legs and the flexible connectors connect the body with the legs.

3. The mobile device according to claim 2, wherein the guide base includes one or more rails and the cover plate includes one or more corresponding fins that are positioned on the legs, wherein the fins engage the rails and slide along the rails as the cover plate and the slider portion move in the same direction.

4. The mobile device according to claim 1, wherein the cover plate and the slider portion move in an x-direction when the slider portion moves from the closed position to the open position and the cover plate also moves in a y-direction when the slider portion moves from the closed position to the open position, wherein the x-direction and the y-direction are substantially perpendicular to one another.

5. The mobile device according to claim 1, wherein the guide base also defines a slot and the slot of the sliding plate and the slot of the guide base are configured to receive a flexible circuit.

6. The mobile device according to claim 1, wherein the cover plate includes a plastic section and a metal section and the friction coefficient between the plastic section of the cover plate and the sliding plate is greater than the friction coefficient between the metal section of the cover plate and the guide base.

7. The mobile device according to claim 6, wherein the plastic section includes a beveled edge and the sliding plate also includes a beveled edge, wherein the beveled edge of the sliding plate contacts and pushes the beveled edge of the cover plate when the slider portion is moved back to the closed position.

8. The mobile device according to claim 1, wherein the slider portion includes a display and the base portion includes a keypad, wherein the keypad is hidden when the slider portion is in the closed position.

9. A mobile device, comprising:

a base portion;

a slider portion that is slidably engaged with the base portion, wherein the slider portion moves from a closed position to an open position to provide operator access to a user interface component of the base portion;

a sliding plate that is part of the slider portion, wherein the sliding plate includes an exposable surface defining a slot, wherein the sliding plate moves along with the slider portion from the closed position to the open position; and a cover plate, wherein the cover plate is engaged with the sliding plate such that the cover plate moves along with the sliding plate;

wherein the cover plate moves from a compressed state to a release state when the sliding plate moves to the open position such that the cover plate is substantially flush with the exposable surface of the sliding plate when the cover plate is in the release state;

wherein the base portion includes a guide base and the cover plate includes a body and one or more legs, wherein the body is in contact with the sliding plate and the legs are in contact with the guide base and wherein a friction coefficient between the body and the sliding plate is greater than a friction coefficient between the legs and the guide base.

10. The mobile device according to claim 9, wherein the cover plate further includes one or more flexible connectors that connect the body with the legs and the flexible connectors assist in moving the cover plate from the compressed state to the release state.

11. The mobile device according to claim 10, wherein the flexible connectors are positioned at a non-orthogonal angle with respect to the body and the legs.

12. The mobile device according to claim 9, wherein the body and the legs are made of metal and at least part of the metal of the body is covered with plastic.

13. The mobile device according to claim 9, further comprising a flexible circuit that is connected to both the base portion and the slider portion and wherein the cover plate at least partially covers the flexible circuit when the slider portion is in the open position.

* * * * *